United States Patent [19]

Patry

[11] 4,448,073
[45] May 15, 1984

[54] WHEEL BALANCING DEVICE

[76] Inventor: Louison Patry, 393 8th Street West, Thetford Mines, Quebec, Canada

[21] Appl. No.: 392,461

[22] Filed: Jun. 28, 1982

[51] Int. Cl.³ .............................................. G01M 1/02
[52] U.S. Cl. ........................................ 73/484; 73/486
[58] Field of Search ................. 73/486, 483, 484, 485, 73/487

[56] References Cited

U.S. PATENT DOCUMENTS

| | | | |
|---|---|---|---|
| 2,478,477 | 8/1949 | Graves | 73/486 |
| 2,589,456 | 3/1952 | Tinkham | 73/483 |
| 3,148,546 | 9/1964 | Karig | 73/486 |
| 3,388,589 | 6/1968 | Campbell | 73/483 |

Primary Examiner—Gerald Goldberg
Assistant Examiner—John E. Chapman, Jr.

Attorney, Agent, or Firm—Cushman, Darby & Cushman

[57] ABSTRACT

The device described is designed to balance wheels and comprises a tripod, an element sliding vertically and mounted upon the tripod, a supporting element serving to support the wheel to be balanced and supported, in turn, in one instance, by the vertically-sliding element, a suspension element mounted upon the tripod and comprising a lever extending above the supporting element, a connecting element uniting the supporting element to the lever and allowing it, in a second instance, to be supported in free suspension upon being released from the vertically-sliding element. A first reference mark is associated with the connecting element, and a second reference mark is associated with the supporting element. Wheel balancing is carried out by adding weights to the wheel until the two reference marks coincide.

8 Claims, 4 Drawing Figures

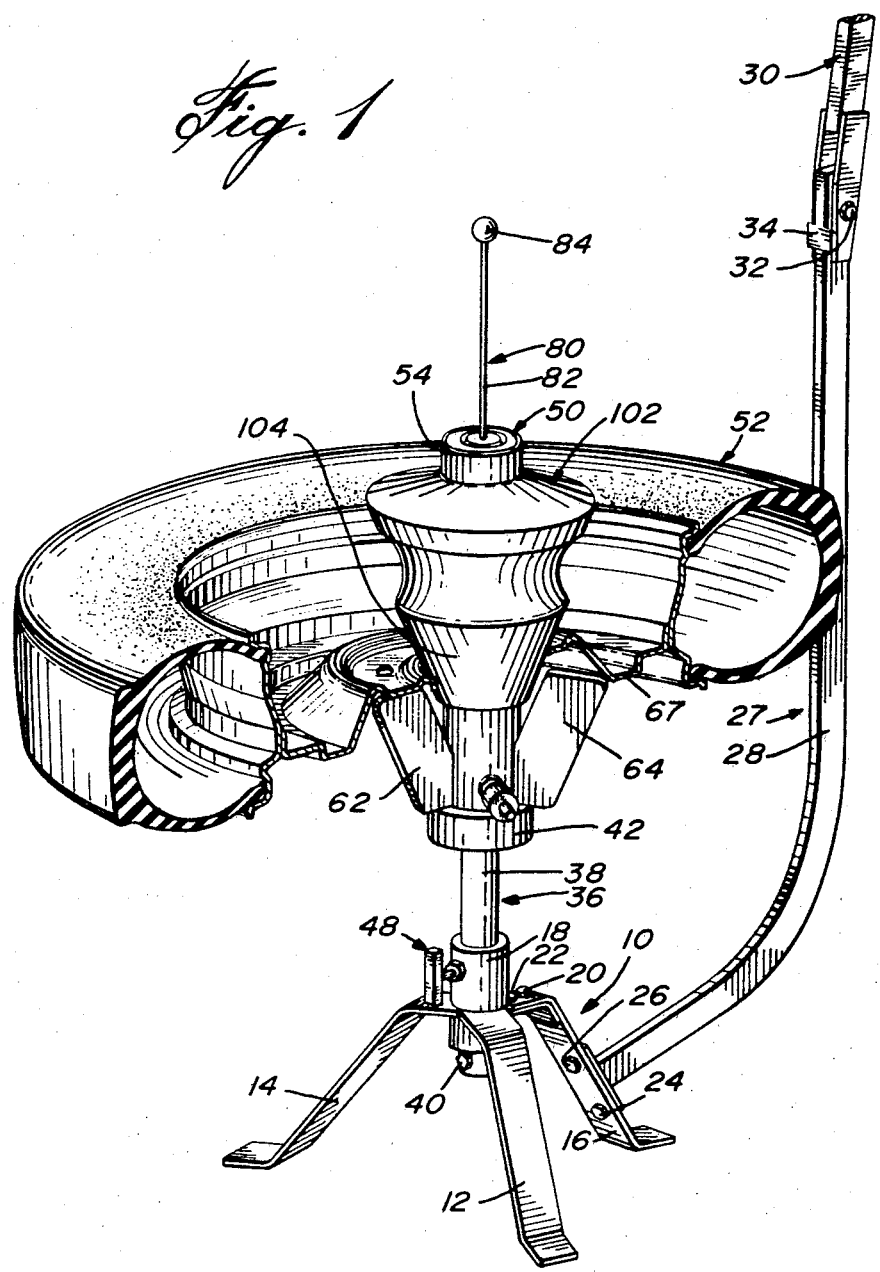

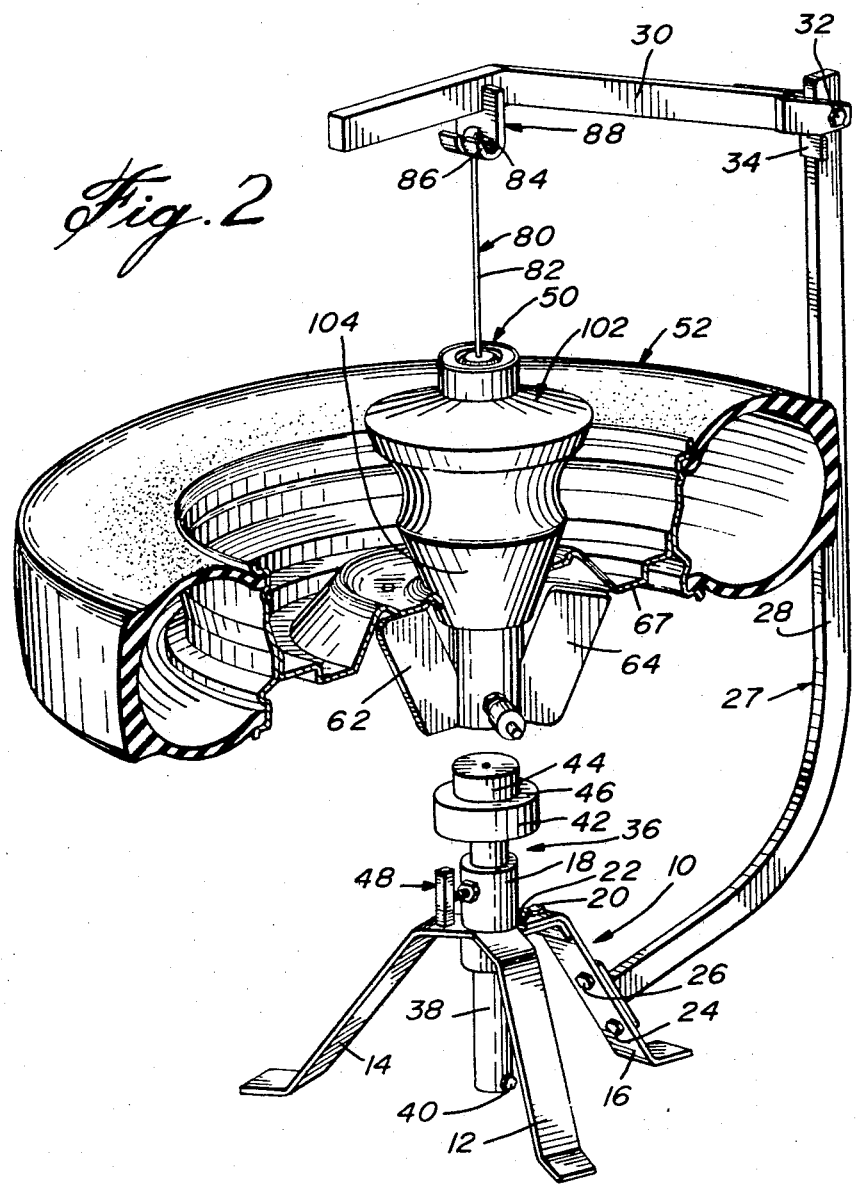

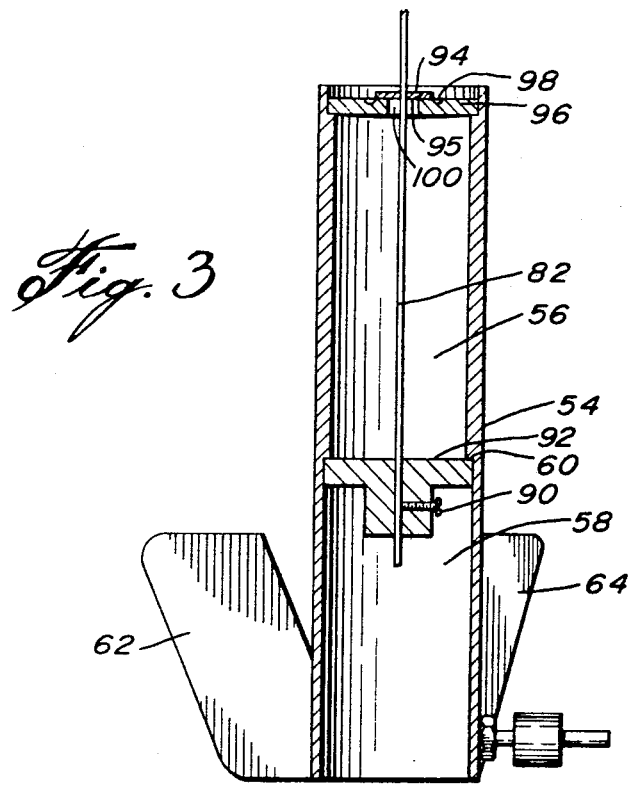
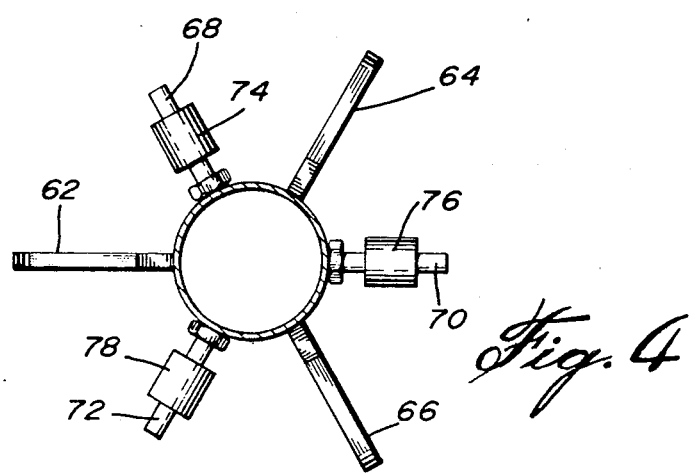

WHEEL BALANCING DEVICE

FIELD OF THE INVENTION

The present invention relates to a device designed to balance vehicle wheels.

BACKGROUND OF THE INVENTION

Many such devices are known. In most of these devices, balancing is carried out by placing the wheel to be balanced upon a mounting which stands on the ground, and adding weights to the wheel until two reference marks coincide.

STATEMENT OF THE INVENTION

The present invention differs from these known designs in that it operates upon a new principle: free suspension of the wheel. Thus the gravitational effect of the wheel and its supporting element is used to determine the gravity of the weights and their location upon the wheel in order to achieve perfect coincidence of the two reference marks.

The present invention therefore relates to a device comprising, in the broadest sense: a tripod; a vertically-sliding element mounted upon the tripod; a supporting element designed to support the wheel to be balanced, the supporting element being supported, in turn, in one instance, by the vertically-sliding element; a suspension element mounted upon the tripod and comprising a lever extending above the supporting element; a connecting element uniting the supporting element to the lever and allowing the supporting element, in a second instance, to be supported in free suspension upon being released from the vertically-sliding element; a first reference mark associated with the connecting element; and a second reference mark associated with the supporting element. Wheel balancing is effected by adding weights to the wheel until the two reference marks coincide.

IN THE DRAWINGS

In the drawings attached hereto and illustrating an example of embodiment of the invention:

FIG. 1 is a view showing a wheel in partial section mounted upon the device of the present invention;

FIG. 2 is a view similar to that in FIG. 1 showing the wheel in free suspension above the device;

FIG. 3 is a section showing a part of the interior of the supporting element, and FIG. 4 is a view from below of the supporting element according to FIG. 3.

DESCRIPTION OF PREFERRED EMBODIMENTS

The device illustrated in FIG. 1 comprises first of all a tripod 10 having three legs 12, 14, 16, the upper end of each being integral with a tubular element 18. In order to facilitate transportation of the device, the upper portion of part 16 is secured by two bolts 20, 22 and is therefore detachable.

The device also comprises a suspension element marked 27 as a whole, secured to the lower part of leg 16 by means of bolts 24, 26 and comprising an arm 28 running vertically of the device. The upper part of this arm carries a lever 30 adapted to pivot about an axis 32. A stop 34 is integral with the inside surface of arm 28 and thus restricts the pivoting movement of lever 30 about axis 32 thereof.

The device also comprises an element 36 adapted to slide vertically in tripod 10. This element comprises a vertical rod 38, the lower end of which is fitted with a screw-nut 40, while the upper end comprises two cylindrical sections 42, 44 of different diameters which are arranged to form a shoulder 46. A locking element 48 is mounted in cylindrical part 18 in order to locate element 36 in relation to tripod 10.

The device according to the present invention also comprises a supporting element 50 which supports the wheel 52 which is to be balanced. It may be gathered from FIG. 3 that this supporting element consists of an elongated tube 54 the internal wall of which comprises two sections 56, 58 of different diameters, thus forming a shoulder 60, the purpose of which will be described hereinafter. The external wall of tube 54 carries three fins 62, 64, 66 (see FIG. 4) which support the rim 67 of the wheel. Three radial rods 68, 70, 72 are secured to the external wall of the tube, each carrying a weight 74, 76, 78 which is adapted to slide horizontally, the purpose of which will be described hereinafter. The diameter of internal wall 58, at least at the lower end of the tube, is slightly greater than the inside diameter of cylindrical part 44 of element 36, in such a manner that tube 54 may sit upon shoulder 46.

The device according to the present invention also comprises a connecting element 80 uniting supporting element 50 and lever 30. This element consists, first of all, of a steel wire 82, the upper part of which is integral with a spherical mass 84 arranged horizontally and accommodated in curved part 86 of a fork 88 integral with lever 30. The lower part of steel wire 82 is secured by a screw 90 to a disc 92 which bears against shoulder 60 of tube 54.

Two reference marks are used. A first reference mark 94 is secured at a certain height on steel wire 82, while a second reference mark appears on a transparent disc 96 secured in the upper part of tube 54 and having a circular groove 98, the dimension of which corresponds substantially to that of reference mark 94. The central part of transparent disc 96 is provided with an opening 100 for the passage of steel wire 82.

A description will now be given of the operation of the present invention. Counterweights 74, 76, 78 are initially adjusted along rods 68, 70, 72 so that element 50 and connecting element 80 are both balanced in relation to a vertical axis passing through the steel wire and tube 54. Vertically-sliding element 36 is secured in tripod 10. Supporting element 50 is then arranged in such a manner as to allow tube 54 to rest upon shoulder 46 of element 36. Wheel 52, with its rim 67, is placed upon fins 62, 64, 66 and a locking element 102, comprising a hollow cylindrical internal part, is fitted to element 54 until lower conical part 104 is wedged against the internal edge of rim 67.

Lever 30 is then pivoted to allow element 84 to enter fork 88. Element 48 is then unlocked and element 36 slides, under the influence of gravity, towards the bottom of the tripod. This leaves wheel 52, mounted upon element 50, freely suspended below lever 30, the latter being held in the position shown in FIG. 2 by stop 34 on arm 28.

The wheel is then balanced by adding weights to the rim thereof in such a manner as to cause disc 94 to coincide over part 95 defined by groove 98 in disc 96.

As soon as the wheel has been properly balanced, element 36 is raised in order to support element 50. This permits mass 84 to be released from fork 88 and arm 30 to be removed by pivoting about axis 32. The balanced wheel may now be released from supporting element 50, after part 102 has been withdrawn.

The embodiments of the invention in which an exclusive property or privilege is claimed are defined as follows:

1. A device designed to balance wheels comprising:
   (a) a tripod;
   (b) a vertically sliding element mounted upon said tripod;
   (c) a supporting element serving to support a wheel to be balanced, said supporting element itself supported, in one instance, upon said vertically-sliding element;
   (d) a suspension element mounted upon said tripod and including a lever extending over said supporting element;
   (e) a connecting element uniting the supporting element to said lever and allowing said supporting element, in a second instance, to be supported in free suspension upon being released from said vertically-sliding element;
   (f) a first reference mark associated with said connecting element; and
   (g) a second reference mark associated with said supporting element, the balancing of the wheel being effected by adding weights to the wheel until the two reference marks coincide.

2. A device according to claim 1, wherein locking means are provided in order to secure the vertically-sliding element in a position in which it supports said supporting element.

3. A device according to claim 1, wherein said suspension element comprises an arm, one end of which is secured to the tripod, while the other end supports the lever, said lever being pivotable in relation to said secured arm, and said arm comprising a stop serving as a point of support for said lever during suspension of the supporting element.

4. A device according to claim 1, wherein said supporting element comprises: a cylindrical tube, the outer wall of which comprises fins upon which the wheel is seated and means secured to the interior of the tube and serving to hold one end of the connecting element.

5. A device according to claim 4, wherein said holding means comprise a pierced disc secured to the internal wall of the cylindrical tube and means for securing said connecting element to said disc.

6. A device according to claim 4, wherein counterweights are distributed uniformly over the external wall of the tube to allow the supporting element to be balanced prior to receiving the wheel.

7. A device according to claim 4, wherein said supporting element also comprises a transparent disc mounted in the upper part of the tube, said disc being pierced centrally to allow passage of the connecting element, said second reference mark being mounted upon said disc and comprising a circular groove, the dimension of which corresponds to the first reference mark.

8. A device according to claim 7, wherein the first reference mark is mounted on the connecting element on a level with said transparent disc.

* * * * *